June 13, 1950 D. C. WARREN 2,511,386
SEAL FOR SWIVEL JOINTS
Filed Dec. 3, 1945

INVENTOR.
Doyle C. Warren
BY
Attorney

Patented June 13, 1950

2,511,386

UNITED STATES PATENT OFFICE 2,511,386

SEAL FOR SWIVEL JOINTS

Doyle C. Warren, Monrovia, Calif., assignor to Chiksan Company, Brea, Calif., a corporation of California Application December 3, 1945, Serial No. 632,567

4 Claims. (Cl. 285—97.3)

1

This invention has to do with a seal for swivel joints and it is a general object of the invention to provide a simple, inexpensive, effective and dependable seal operable to check the entrance of foreign matter into a joint and to also check the escape of lubricant, or the like, that may be employed in the joint.

The seal that I have provided by my present invention is useful, generally, in swivel or rotating joints, or the like. However, it is particularly applicable to such constructions handling steam or like hot fluids where ordinary packing or sealing rings do not work satisfactorily. The usual packing ring fails to work satisfactorily in a situation such as I have referred to due to the fact that packing material is affected by the temperatures involved, and due to the fact that there is often considerable change in the size and shape of parts due to shrinkage and expansion. When a packing material such as rubber or rubber-like composition is employed, and the resilience of the material is depended upon to effect the seal, the temperatures involved usually act on the material to weaken or destroy it so that the structure fails after a very short period of use. On the other hand, when so-called steam packings are used, that is, packings formed mainly of asbestos or like materials that are not resilient, considerable difficulty is experienced in keeping the parts tight when shrinkage and expansion takes place. It is a general object of my present invention to provide a packing ring or sealing ring which is so formed and which involves a resilient element making it possible to form the packing body of the ring out of heat resisting material such as asbestos composition and yet maintain a ring having life which compensates for shrinkage and expansion.

Another object of this invention is to provide a seal or packing ring of the general character referred to operable between two members, one operating within the other, so that the sealing engagement is effected by bearing engagement in a radial direction as distinguished from an axial direction.

Another object of my invention is to provide a packing assembly involving a body of packing material and an expansion ring which ring is extremely simple and inexpensive of manufacture, being in the form of a simple split wire ring.

The various objects and features of my invention will be fully understood from the following detailed description of a typical preferred form and application of the invention, throughout which description reference is made to the accompanying drawings, in which:

2

Figure 1:
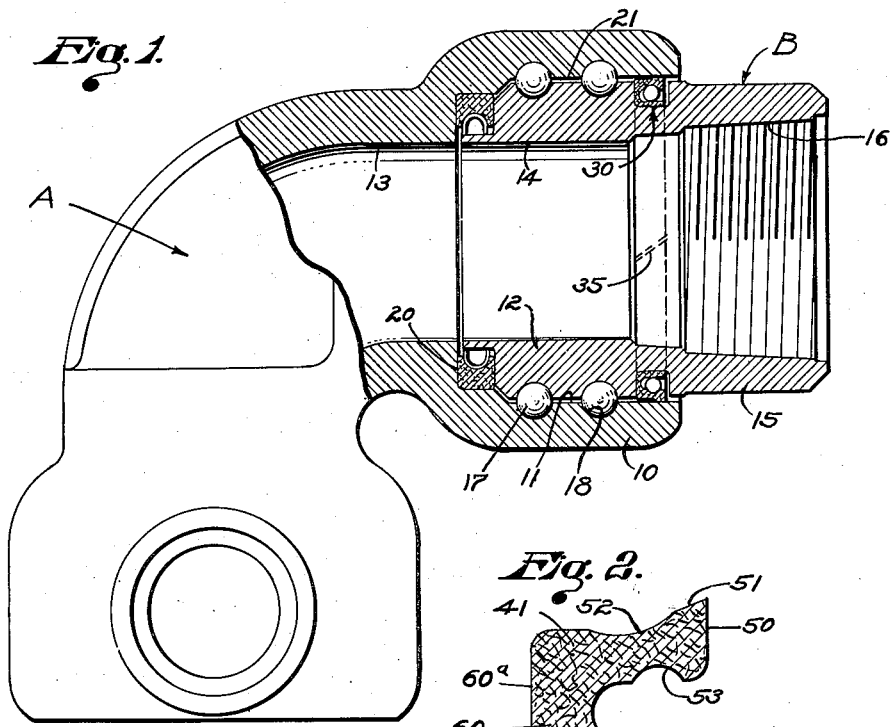
Figure 2:
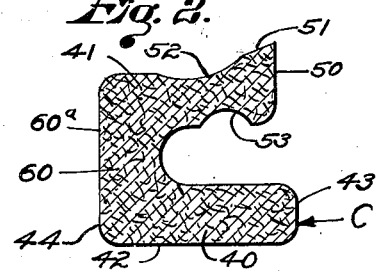
Figure 3:
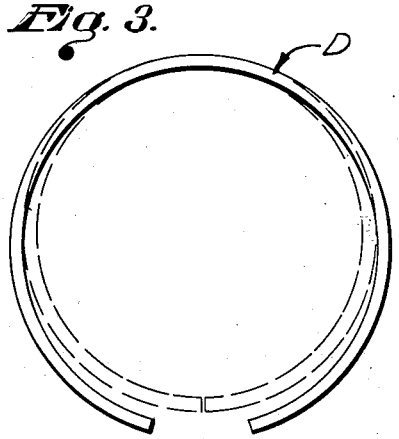
Figure 4:
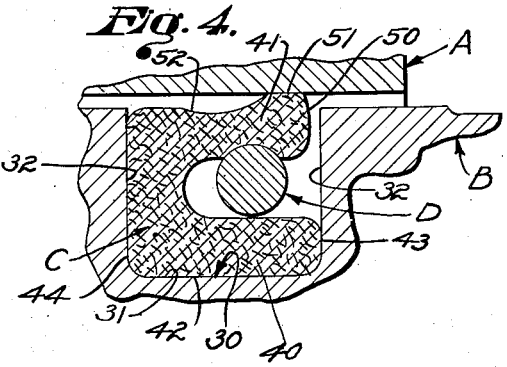

Fig. 1 is a side view of a swing or swivel joint embodying the present invention, a part of the joint being broken away to show in section. Fig. 2 is an enlarged detailed cross sectional view of the packing body that I have provided, showing it in its original or formed shape, being the shape that it is in before being arranged in a joint. Fig. 3 is a side view of the expander ring shown apart from the packing body, showing the ring in its original or expanded position in full lines and indicating it in its working or collapsed position in dotted lines, and Fig. 4 is an enlarged detailed view of a portion of the structure shown in Fig. 1, showing the structure that I have provided in working position with the expander ring in place acting on the packing body.

The structure of the present invention can be used in various situations, for instance, it is applicable, generally, to joints or connections where two parts are connected to turn one relative to the other. A typical example of an application of the present invention is a swivel joint such as may involve an L-section A and a nipple section B. In the structure shown in the drawings the L-section has an enlarged end 10 formed with a socket 11 and the nipple section B has an inner end portion 12 which extends into and is rotatably supported in the socket 11. In the structure shown the L-section has a fluid passage 13 that communicates with a corresponding fluid passage 14 in the nipple section. The outer end portion 15 of the nipple projects beyond the end of part 10 and is provided with means for making connection with a conduit such as a pipe or the like. In the case illustrated the part 15 is internally threaded at 16 to receive a pipe or like element.

The sections A and B are held together for relative rotation. In the case illustrated two series of balls 17 are provided to operate in registering grooves 18 in the socket 11 and the outer wall of the nipple part 12.

In the particular structure illustrated in Fig. 1 of the drawings a pressure sealing ring 20 is provided between the inner end portion of the nipple section B and the bottom of the socket 11 in the part 10 of the L-section so that steam or other fluid handled by the joint is sealed away from the region in which the balls 17 operate. The particular ring 20 shown is more fully described and claimed in my copending application Serial No. 632,568, filed December 3, 1945, entitled "Swing joint for handling steam or the like." It is preferred in practice to provide a suitable clearance or chamber 21 between the outer wall of the nipple part 12 and the socket 11 to accommodate a suitable body of lubricant and to provide free working clearance between the sections A and B.

The structure that I have provided is suitable for use as a retainer for lubricant and as a check or seal against the admission of foreign matter into the joint construction that I have thus far described. In the particular case illustrated I have shown my construction applied between the outer end portion of the socket 11 and the nipple B at a point intermediate the ends of the nipple or where the nipple parts 12 and 15 join.

To accommodate the sealing or packing ring that I have provided I establish an annular chamber to carry the packing structure, which chamber is preferably substantially square in cross-sectional configuration. In practice the desired packing chamber can be formed in various ways, that is, it can be established in either of the elements that are swivelly connected or it may be partially formed in both such elements. In the case illustrated I have shown a groove or channel 30 formed in the outer wall of the nipple section B at a point to occur opposite the outer end portion of the socket 11. The channel 30 is made to accommodate the packing ring and in the case illustrated has a flat bottom 31 and spaced parallel radial sides 32.

The packing ring that I have provided involves, generally, two elements, a body C of packing material and an expander ring D. The body C of packing material may vary widely in composition or texture. However, for the purpose of handling steam or like hot fluids I prefer to employ a packing material formed primarily of asbestos or the like. The packing body C may be advantageously formed of a mixture of asbestos and neoprene or polychloroprene in which the asbestos is the principal element involved, while the neoprene serves primarily as a binder to hold the asbestos in a firm or solid body. By thus forming the packing body C of asbestos or the like bound with a material such as neoprene it is possible to mold or form it into any desired shape and it is preferred, when employing the construction that I have provided, to mold the packing body into the form of a continuous ring having the cross-sectional configuration shown in Fig. 2 of the drawings. To facilitate the application of such ring to the groove 30 the ring may be split so that it is a split ring and if a split is provided it is preferred to make it at an angle, such as is indicated at 35 in Fig. 1.

The packing body C formed in accordance with my invention involves two concentric ring portions, one located within the other, which rings are joined by a radially disposed web portion. One of the rings is preferably a permanent or fixed sealing ring while the other is a lip ring against which a part of the structure operates or moves. In the particular case illustrated the inner ring 40 of the packing body is the fixed sealing ring, while the outer ring 41 is a lip ring.

The fixed sealing ring 40 of the packing has a flat inner side 42 shaped and proportioned to seal or seat against the bottom 31 of the groove 30 and it has ends 43 and 44, respectively, which engage and seat against the side walls 32 of the groove 30 to seal therewith.

The lip ring 41 of the packing body is designed to have some radial movement and in its preferred form it has an outer end portion 50 in the nature of a lip having a flat sealing face 51 designed to bear against the part to be sealed. Inward of the lip the outer side of the lip ring is recessed or made concave at 52 and the inner side is recessed or grooved at 53. These opposite recesses or grooves shape the cross-section of the lip ring so that it is readily flexed or moved radially and the recess or groove 53 acts as a retainer for the expander ring D, as will be hereinafter described.

The sealing surface 51 at the lip portion of the lip ring is preferably flat and as the ring is initially formed it is pitched or inclined somewhat, as shown in Fig. 2, but when the ring is compressed into place, as shown in Figs. 1 and 4, the flat face 51 bears with pressure engagement against the wall of the socket 11 in the L-section A.

The web portion of the packing body is joined to or projects from one end of the sealing ring 40 and extends radially outward to join with or to the corresponding end of the lip ring 41 so that it joins with the lip ring at the end opposite the lip part 50. The web portion 60 is preferably proportioned so that the inner end of the lip ring to which it joins is spaced somewhat from the wall of the socket 11 so that the engagement between the packing and the wall of the socket is confined to the surface 51 formed and designed for that purpose.

In the preferred formation of the web 60 its outer side 60ª bears on one wall or side 32 of the groove 30 and, further, I prefer to proportion the lip ring 41 so that it extends or projects toward the other wall 32 but does not actually contact it. A supply space or clearance is provided between the lip portion 50 of the lip ring and the said other wall 32 of the grove 30 so that the outer or lip portion of the lip ring is free and unobstructed to be effectively moved into sealing engagement by the expander ring D.

To gain this relationship of parts the sealing ring 40 is made slightly longer axially than the lip ring 41, as will be apparent from Figs. 2 and 4 of the drawings.

The expander ring D is preferably a simple split spring wire ring formed of a metal that will not corrode under the operating conditions encountered and formed of a metal having the desired spring or resilience so that the ring can be initially formed as shown in full lines in Fig. 3 and can be collapsed to a position as indicated in dotted lines shown in Fig. 3, where its ends are practically together and where it is accommodated between the rings 40 and 41 of the packing body, as shown in Figs. 1 and 4 of the drawings. When the expander ring is in position in the packing body it is held in the groove 53 in the lip ring and due to its resilience it bears outwardly on the lip ring of the packing body and thus expands the surface 51 of the lip ring into pressure engagement with the wall of the socket 11.

With the construction that I have provided the packing body C effectively checks or seals against passage of material in either direction between the nipple and the outer end portion of the socket 11. The sealing ring 40 is seated in the bottom of the groove 30 and its ends 43 and 44 bear against the sides 32 of the groove to check passage of material in either direction under the packing body and the expander ring D urges the lip ring 41 of the packing body out so that the surface 51 is maintained in pressure engagement with the wall of the socket preventing passage of material in either direction at that point. By limiting the surface 51 in extent there is a minimum amount of friction established between the sections A and B and by providing the expander ring D within the lip ring I effectively compensate for shrinkage and expansion and I am able to use a packing material in the packing body C which is not, in and of itself, sufficiently resilient to maintain sealing engagement over an extended period of time.

Having described only a typical preferred form and application of my invention, I do not wish to be limited or restricted to the specific details herein set forth, but wish to reserve to myself any variations or modification that may appear to those skilled in the art and fall within the scope of the following claims.

Having described my invention, I claim:

1. A packing ring of the character described comprising only two elements, one a unitary annular body of packing material having two concentric ring portions one within the other and both extending axially of the packing ring and both of substantially the same axial extent, the rings being connected together at one end of the packing by a radially extending web leaving each ring with a free axially projecting portion, the projecting end portion of the outermost ring being thickened and having an outer sealing face inclined to the axis of the packing, and the other element being an expansion ring confined between the rings of the body and normally engaging only the inner side of the outer ring of the body and bearing outwardly therein.

2. A packing ring of the character described comprising only two unitary elements, one a single body of packing material having two concentric ring portions one within the other and both extending axially of the packing ring and both of substantially the same axial extent, the rings being connected together at one end of the packing by a radially extending web leaving each ring with a free axially projecting portion, the projecting end portion of the outermost ring being thickened and having an outer sealing face inclined to the axis of the packing, and the other element being an expansion ring confined between the rings of the body and normally engaging only the inner side of the outer ring of the body and bearing outwardly in said outer ring, the inner and outer walls of the outer ring of the body being concave so the thickened part of the said outer ring is freely movable radially, the concave inner portion of the said outer ring receiving and holding the expansion ring against axial movement relative to the body.

3. In a swivel connection two tubular elements connected for relative rotation and having axially opposed portions, one element having an axial socket facing the other element and receiving a part of said other element, said parts of the other element having an annular channel that is substantially rectangular in cross section and which opens outwardly to face the wall of the socket, and a sealing means between the elements and in said channel and including a generally rectangular body of packing occupying the channel and having two substantially parallel axially disposed and radially spaced ring portions one an inner ring seated in and wholly occupying the bottom of the channel and the other an outer lip ring projecting from the channel to contact the wall of said socket and a web adjacent and bearing on one end of the groove and connecting the ring portions at one end of the body, and a ring shaped resilient expander confined between the rings and engaging only the lip ring to hold it in pressure engagement with said wall of the socket, the lip ring having a free lip portion projecting axially from the expander and closely approaching the other end of the groove to have working clearance therewith and shaped to normally bear outwardly against the wall of the socket.

4. A fluid handling conduit including, an outer tubular element with a central axial bore entering it from one end and forming a socket, an inner tubular element with a portion round in cross section extending into the socket and having an end opposing the bottom of the socket, means mounting the said portion of the inner element in the socket to rotate therein, the said portion of the inner element having an external groove substantially rectangular in cross sectional configuration and facing the wall of the bore, an annular body of packing in the groove and being substantially rectangular in general cross section, the body having an inner face seated on and completely occupying the bottom of the groove and having end portions with faces seated against the side walls of the groove, one of the said end portions of the body completely occupying one side wall of the groove, there being an axially extending channel entering the body of packing from one end and being concentric with the body so the body has an annular axially projecting outer sealing portion anchored to said end portion of the body and having a free portion movable radially into sealing engagement with the wall of the bore, and an expander ring in the channel of the body bearing outwardly on the said outer sealing portion between the ends thereof and holding said free portion in engagement with the wall of the bore, the outer sealing portion being clear of the wall of the bore when it is anchored to said end portion of the body, said free portion of the ring being normally larger in diameter than the said bore to be in pressure engagement with the wall of the bore.

DOYLE C. WARREN.

REFERENCES CITED

The following references are of record in the file of this patent:

UNITED STATES PATENTS

| Number | Name | Date |
| --- | --- | --- |
| 1,621,272 | Raymond | Mar. 15, 1927 |
| 1,938,829 | Hamer | Dec. 12, 1933 |
| 2,106,829 | Christenson | Feb. 1, 1938 |
| 2,162,104 | Mosher | June 13, 1939 |
| 2,253,904 | Haug | Aug. 26, 1941 |
| 2,319,392 | Dick | May 18, 1943 |
| 2,330,425 | Hilton | Sept. 28, 1943 |
| 2,382,375 | Allen et al. | Aug. 14, 1945 |